(12) United States Patent
Vränceanu et al.

(10) Patent No.: US 9,019,402 B2
(45) Date of Patent: Apr. 28, 2015

(54) DYNAMIC RANGE EXTENSION BY COMBINING DIFFERENTLY EXPOSED HAND-HELD DEVICE-ACQUIRED IMAGES

(71) Applicants: Ruxandra Vränceanu, Bucuresti (RO); Razvan George Condorovici, Bucuresti (RO); Foti Coleca, Bucuresti (RO); Corneliu Florea, Bucuresti (RO)

(72) Inventors: Ruxandra Vränceanu, Bucuresti (RO); Razvan George Condorovici, Bucuresti (RO); Foti Coleca, Bucuresti (RO); Corneliu Florea, Bucuresti (RO)

(73) Assignee: FotoNation Limited, Ballybrit, Galway (IE)

( * ) Notice: Subject to any disclaimer, the term of this patent is extended or adjusted under 35 U.S.C. 154(b) by 93 days.

(21) Appl. No.: 13/984,487

(22) Filed: Aug. 8, 2013

(65) Prior Publication Data

US 2013/0314568 A1 Nov. 28, 2013

Related U.S. Application Data

(60) Provisional application No. 61/444,565, filed on Feb. 18, 2011.

(51) Int. Cl.
| | | |
|---|---|---|
| H04N 5/262 | (2006.01) | |
| H04N 5/235 | (2006.01) | |
| G06T 5/00 | (2006.01) | |
| G06T 5/40 | (2006.01) | |
| G06T 5/50 | (2006.01) | |

(52) U.S. Cl.
CPC .............. *H04N 5/2355* (2013.01); *G06T 5/009* (2013.01); *G06T 5/40* (2013.01); *G06T 5/50* (2013.01); *G06T 2207/20208* (2013.01); *G06T 2207/20221* (2013.01)

(58) Field of Classification Search
CPC .................................................... H04N 5/2355
USPC ........................................................ 348/239
See application file for complete search history.

(56) References Cited

U.S. PATENT DOCUMENTS

| | | | |
|---|---|---|---|
| 6,240,217 B1 | 5/2001 | Ercan et al. | |
| 6,529,233 B1 | 3/2003 | Allen | |

(Continued)

FOREIGN PATENT DOCUMENTS

| | | |
|---|---|---|
| EP | 1367538 A2 | 12/2003 |
| WO | 2005/101309 A1 | 10/2005 |

(Continued)

OTHER PUBLICATIONS

PCT Notification of Transmittal of International Preliminary Report on Patentability Chapter I (IB/326) and International Preliminary Report on Patentability Chapter I (IB/373), for PCT Application No. PCT/IB2012/000381, report dated Aug. 21, 2013, 9 pages.

(Continued)

*Primary Examiner* — Christopher K Peterson
(74) *Attorney, Agent, or Firm* — Hickman Palermo Becker Bingham LLP (57) ABSTRACT

Two or more digital images of a same scene are captured with different exposure levels. Image pairs are generated that have a same exposure level from the image data of differently exposed images by adjusting the exposure of at least one of the pair of images. A ghosting map is generated based on differences between the pair of images adjusted to the same exposure. A blurred ghosting map is generated and alpha blending is performed.

28 Claims, 10 Drawing Sheets

(56) References Cited

U.S. PATENT DOCUMENTS

| | | |
|---|---|---|
| 7,317,843 B2 | 1/2008 | Sun et al. |
| 7,469,071 B2 | 12/2008 | Drimbarean et al. |
| 7,506,057 B2 | 3/2009 | Bigioi et al. |
| 7,551,755 B1 | 6/2009 | Steinberg et al. |
| 7,620,218 B2 | 11/2009 | Steinberg et al. |
| 7,630,006 B2 | 12/2009 | DeLuca et al. |
| 7,660,478 B2 | 2/2010 | Steinberg et al. |
| 7,680,342 B2 | 3/2010 | Steinberg et al. |
| 7,685,341 B2 | 3/2010 | Steinberg et al. |
| 7,692,696 B2 | 4/2010 | Steinberg et al. |
| 7,773,118 B2 | 8/2010 | Florea et al. |
| 7,787,022 B2 | 8/2010 | Steinberg et al. |
| 7,953,287 B2 | 5/2011 | Drimbarean et al. |
| 8,508,652 B2 | 8/2013 | Albu et al. |
| 2002/0093670 A1 | 7/2002 | Luo et al. |
| 2003/0184671 A1 | 10/2003 | Robins et al. |
| 2005/0243176 A1 | 11/2005 | Wu et al. |
| 2006/0008171 A1 | 1/2006 | Petschnigg et al. |
| 2007/0296833 A1 | 12/2007 | Corcoran et al. |
| 2008/0013798 A1 | 1/2008 | Ionita et al. |
| 2008/0219581 A1 | 9/2008 | Albu et al. |
| 2008/0309769 A1 | 12/2008 | Albu et al. |
| 2008/0309770 A1 | 12/2008 | Florea et al. |
| 2008/0316341 A1 | 12/2008 | DeLuca et al. |
| 2009/0080796 A1 | 3/2009 | Capata et al. |
| 2009/0115915 A1 | 5/2009 | Steinberg et al. |
| 2009/0167893 A1 | 7/2009 | Susanu et al. |
| 2009/0179998 A1 | 7/2009 | Steinberg et al. |
| 2009/0179999 A1 | 7/2009 | Albu et al. |
| 2009/0185753 A1 | 7/2009 | Albu et al. |
| 2009/0263022 A1 | 10/2009 | Petrescu et al. |
| 2009/0303343 A1 | 12/2009 | Drimbarean et al. |
| 2009/0304278 A1 | 12/2009 | Steinberg et al. |
| 2010/0026833 A1 | 2/2010 | Ciuc et al. |
| 2010/0232726 A1 | 9/2010 | Liu |
| 2010/0271512 A1* | 10/2010 | Garten ............ 348/239 |
| 2010/0329582 A1 | 12/2010 | Albu et al. |
| 2011/0102643 A1 | 5/2011 | Nanu et al. |
| 2011/0115928 A1 | 5/2011 | Corcoran et al. |
| 2011/0141226 A1 | 6/2011 | Stec et al. |
| 2011/0141227 A1 | 6/2011 | Bigioi et al. |
| 2011/0205381 A1 | 8/2011 | Vranceanu et al. |
| 2012/0008002 A1 | 1/2012 | Bigioi et al. |
| 2012/0106790 A1 | 5/2012 | Sultana et al. |
| 2012/0133746 A1 | 5/2012 | Bigioi et al. |

FOREIGN PATENT DOCUMENTS

| | | |
|---|---|---|
| WO | 2007/073781 A1 | 7/2007 |
| WO | 2012/110894 A1 | 8/2012 |

OTHER PUBLICATIONS

PCT Written Opinion of the International Search Authority, for PCT Application No. PCT/IB2012/000381, report dated Aug. 18, 2013, 7 pages.

Rafael C. Gonzalez and Richard E. Woods, "Digital image processing," Second Edition, Ed Prentice Hall, 2001, subsection 3.3.2 Histogram Matching (Specification), pp. 94-103.

Petschnigg G et al: "Digital photography with flash and no-flash image pairs" Proceedings ACM SIGGRAPH, Aug. 8, 2004, pp. 664-672, XP002398974.

James Owens: "Method for depth of field (DOF) adjustment using a combination of object segmentation and pixel binning" Research Disclosure, Mason Publications, Hampshire, GB, vol. 478, No. 97, Feb. 1, 2004, XP007133451 ISSN: 0374-4353.

Patent Abstracts of Japan, publication No. 2002-223355, date of publication of application: Aug. 9, 2002, for: Mage Processor and Recording Medium With Image Processing Program Recorded Thereon.

Patent Abstracts of Japan, publication No. 2001-57630, date of publication of application: Feb. 27, 2001, for: Mage Processing Unit and Image Processing Method.

Patent Abstracts of Japan, publication No. 03-283978, date of publication of application: Dec. 13, 1991, for: Multi-Function Digital CCD Camera.

PCT Notification of Transmittal of the International Search Report and the Written Opinion of the International Searching Authority, or the Declaration, for PCT Application No. PCT/IB2012/000381, report dated Jul. 9, 2012, 12 pages.

Youm S-J, Cho W-H, Hong K-S, High Dynamic Range Video through Fusion of Exposure-Controlled Frames, Proceedings of the Ninth Conference on Machine Vision Applications. May 16-18, 2005, Tsukuba Science City, Japan, The University of Tokyo, Tokyo, JP, May 16, 2005, pp. 546-549, XP002562045, ISBN: 978-4-901122-04-7.

Jacobs K, Ward G, Loscos C: "Automatic HDRI generation of dynamic environments,". International Conference on Computer Graphics and Interactive Techniques Archive ACM SIGGRAPH 2005 Sketches. ACM New York. NY. US. No. 43. Jul. 31, 2005. p. 1. XP002562044.

* cited by examiner

Work Flow

Figure 3

Figure 6 — HDR image (with ghosting)

Figure 5 — Overexposed image

Figure 4 — Underexposed image

Figure 12 — Final HDR picture (without ghosting)

Figure 11B — Mask used for alpha blending

Figure 11A — Mask used for alpha blending

Figure 10 — Corrected underexposed picture

Figure 13

Simple HDR

Figure 14

Region-based HDR

Figure 15

Ghosting Removal
Combining 2 image capture with different Exposures & Content procedures an HDR image with ghosting artifacts

Solution:
Transform one of the two pictures so that it has the same content as the other one, but different exposure

Advantage:
Ghosting removal is independent of blending method: having 2 images with same content but different exposure, any image blending method image may be used

DYNAMIC RANGE EXTENSION BY COMBINING DIFFERENTLY EXPOSED HAND-HELD DEVICE-ACQUIRED IMAGES

PRIORITY

This application is a 371 of PCT Application Ser. No. PCT/IB2012/000381, filed Feb. 17, 2012, which claims priority to U.S. provisional patent application Ser. No. 61/444,565, filed Feb. 18, 2011.

BACKGROUND

Modern digital photo cameras have a limited dynamic range capability, usually not being enough to capture all the details in a scene. The user therefore has to choose between a picture that has details in shadows but is overexposed and one that properly exposes highlights but is underexposed everywhere else. Capturing multiple images of the same scene at different exposure levels and combining them is currently the most common way to achieve a high dynamic range photograph. This offers best results for tripod mounted cameras and static scenes. Conventional display devices have a limited dynamic range and different tone-mapping techniques may be applied to compress the dynamic range of the HDR image, preserving certain relevant details.

Typically, combining two image captures with different exposures and content can tend to produce a high dynamic range (HDR) image with undesired ghosting artifacts, particularly when a handheld digital still camera or cameraphone is being used. Taking multiple exposures with a single aperture tends to lead to ghosting artifacts caused by moving objects in the scene between exposures. Usually by compressing the dynamic range using a tone-mapping technique the contrast of an image may be reduced, although some details are typically lost and the overall appearance intended by the camera's manufacturer is severely altered.

DETAILED DESCRIPTIONS OF THE EMBODIMENTS

Embodiments are provided including methods for generating an output image with an extended dynamic range. The method may include acquiring first and second digital images of approximately a same scene that have first and second exposure levels, respectively. An adjusted version of the first digital image may be generated as an adjusted first digital image. The exposure level of the first digital image may be globally modified to approximately a same first matching exposure level as the second digital image. The second digital image may be globally aligned with the first or adjusted first digital image or both. A ghosting map may be generated based on a first threshold and absolute differences between corresponding pixels of the adjusted first digital image and the second digital image. One or more burnt regions of the second image may be determined using a second threshold. A burnt pixel map may be created of the burnt regions. A blurred ghosting map may be generated. Pixels of the ghosting map may be blurred that correspond to the burnt regions in the burnt pixel map. An adjusted version of the second digital image may be generated as an adjusted second digital image. An exposure level of the second digital image may be globally modified to approximately a same second matching exposure level as the first digital image. The method may include alpha blending the adjusted second digital image and the first digital image based on the blurred ghosting map to generate a safe first digital image, as well as alpha blending the safe first digital image and the second digital image based on the burnt pixel map to create an output image.

The generating of the blurred ghosting map may include applying the blurred burnt pixel map to pixels of the ghosting map after the blurring of the pixels of the ghosting map. The method may further include blurring the burnt pixel map before alpha blending the safe first digital image and the second digital image.

The generating of the blurred ghosting map may include applying the blurred burnt pixel map to pixels of the ghosting map after the blurring of the pixels of the ghosting map. The burnt regions of the second image may contain less detail due to overexposure and saturation than corresponding regions of the first image. The burnt regions of the second image may contain less detail due to underexposure and darkness than corresponding regions of the first image. The ghosting map may include a binary ghosting map.

The first matching exposure level may include the second exposure level, and the second matching exposure level may include the first exposure level. Alternatively, the method may include adjusting the exposure levels of the first and second digital images to the second and first matching exposure levels, respectively, to match the exposure levels of the adjusted second and first images.

A digital image acquisition device is also provided that includes a housing, a lens and image sensor within the housing configured for capturing digital images, a processor, and a memory having stored therein code for programming the processor to perform a method of generating an output image of a scene with an extended dynamic range in accordance with any of the methods described herein. The acquiring of the first and second digital images may or may not involve using the lens and the image sensor.

One or more non-transitory digital storage media are also provided having stored therein code for programming a processor-based and camera enabled device to perform a method of generating an output image of a scene with an extended dynamic range in accordance with any of the methods described herein.

Embodiments are provided to produce HDR images without the undesired ghosting artifacts. The term HDR or high dynamic range is meant to include images that would meet a standard definition of a "HDR image," such as an image having a greater dynamic range between lightest and darkest areas than the digital image acquisition device that captured the image is mechanically and/or optically configured to provide and/or that was set to provide when the image was captured. In other embodiments, an HDR image has a greater dynamic range than a conventional digital image acquisition device (with average, minimal, optimal and/or a selected dynamic range) is mechanically or optically configured to provide. In other embodiments, a HDR image is generated using an advantageous method, digital storage media having code stored therein for programming a processor, and/or a processor-based digital image acquisition device having code stored therein for programming the device to extend the dynamic range of an acquired and/or captured digital image. A HDR image in accordance with further embodiments may have the same dynamic range, such as may be represented for example on 8 bpc.

A HDR image in accordance with certain embodiments can be displayed on conventional display devices, while rendering a greater dynamic range of the scene being displayed. A device in accordance with certain embodiments may be described as being configured to capture an extended dynamic range of a scene.

In certain embodiments, one of two pictures of approximately a same scene is transformed so that it has the same content as the other one, but with different exposure. More than two images may be used in alternative embodiments. Ghosting removal in accordance with certain embodiments is independent of the blending method used, i.e., having two images with the same content but different exposure, any of multiple image blending methods may be used. In one example, alpha blending may be used. By combining large regions of different images in accordance with embodiments described herein, original images may be processed by a camera's ISP without using tone mapping, while not significantly altering the overall appearance intended by the producer and still extending the dynamic range of the captured scene.

Figure 1A:
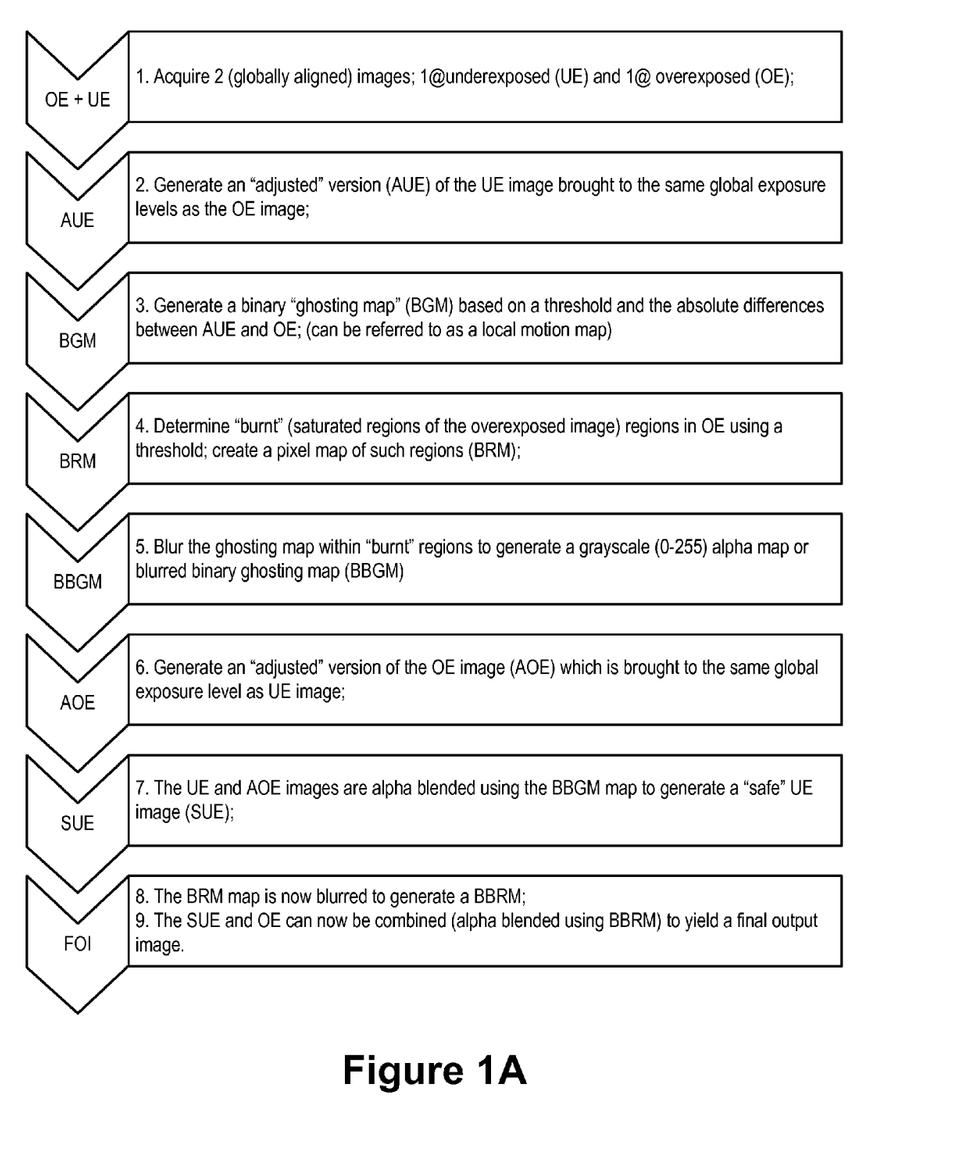
FIG. 1A illustrates a workflow of a technique for extending a dynamic range of a scene captured in a digital image in accordance with certain embodiments.

An example of a workflow in accordance with certain embodiments is illustrated at FIG. 1a Two (or more) images of substantially or approximately the same scene are acquired at step 1 at different levels of exposure. These could be captured at or near the same time by a same sensor or different sensors, such as in successive, sequential or proximately captured images from an image acquisition device offering speeds of long exposure cameras for very dark scenes, to a few to several to 30, 60, 120 or more frames per second, and may be separated by longer times proportional to the degree of stillness of the scene. When the different exposure levels of the two images is greater, the dynamic range can be typically more greatly extended using a technique in accordance with certain embodiments. In certain embodiments, the two images include an underexposed (UE) image and an overexposed (OE) image. The exact degree of over- or underexposure will depend on the precise acquisition conditions for the images. An example of an overexposed image in accordance with certain embodiments would be an image having some degree of detail lost in 1%, 5%, 10%, 15%, 20%, 25% or 30% or more of the over-exposed image due to saturation of one or more pixels, and an example of an underexposed image in accordance with certain embodiments would be an image having some degree of detail lost in 1%, 5%, 10%, 15%, 20%, 25% or 30% or more of the under-exposed image due to darkness of one or more pixels. In one specific example, some degree of detail may be lost in 15% to 25% of one or both images, or in other embodiments more selectively precise around a 1% to 4% range of approximately 20%. These characteristics may vary according to the acquisition conditions and the desired output parameters.

In one embodiment, under- and over-exposed images are captured at −2 eV and +2 eV exposure stops, while 0 eV would be the exposure setting of a normally exposed image or the preset or presumed or selected exposure of a normal image around which the over- and under-exposed images may be captured. In certain embodiments, if there are too many dark or light areas in the under- or over-exposed image scene, respectively, then the normally exposed image can be used as a substitute for the under- or over-exposed image. While this adjustment would reduce the HDR range or degree of dynamic range extension provided by the technique, it would have the advantage of enhanced assurance of producing a working output from each HDR acquisition cycle. These counter-balancing parameters may be selectively matched by the camera automatically, and/or using some manual or acquired or measured input In another embodiment, a normally exposed image may be captured and analyzed to determine, calculate, predict or estimate how many exposure stops can be applied for the OE and UE images while maintaining a reasonable or selected or predetermined assurance of some degree of working output. For example, if a larger area of an image scene has high luminance, then perhaps only +1 eV or +1.5 eV stops might be applied for the OE image instead of the example provided above of +2 eV, and −1 eV, −1.5 eV, −2 eV, −2.5 eV, −3 eV or otherwise might be applied for the underexposed image. These are just examples that apply to certain image data under certain acquisition conditions, and these levels may be adjusted or selected or predetermined based on scene analysis of one or more preview or postview images, or based on a scene luminance measurement, or on analysis of another reference image or image data or metadata, and may be performed automatically by the camera and/or based on camera inputs and/or with or without some manual input In some embodiments where the imaging device can perform exposure measurement across a scene, or where the camera has learned from previous image captures, or wherein the camera has been pre-programmed manually or in response to measured or programmed inputs, the determination of these settings may be made without a first acquisition of a normally exposed image.

As these two images are acquired at slightly different times there may be a global movement of the camera between the two acquisitions and thus a means of globally aligning the two images is employed in accordance with certain embodiments. An exemplary technique for global image alignment is described in US 2008/0309769 to Albu et al., incorporated by reference.

Referring to FIG. 1A, the two images are globally aligned in accordance with certain embodiments before step 2. In alternative embodiments, alignment is performed after step 2. Step 2 involves adjusting the under-exposed image to bring it to approximately the same exposure level as the over-exposed image providing an "adjusted under-exposed" image (AUE). This can be achieved by stretching the image histogram, or otherwise. As the two images are now aligned and at similar luminance/exposure levels any substantial differences at the pixel level between the two images are due to local motion, or potential "ghosting" between the two images.

The third step (step 3) of the example process illustrated at FIG. 1A involves creating a ghosting map, e.g., a binary ghosting map, where variations, beyond a threshold, between the two aligned and exposure matched images represents a potential ghost pixel. Various techniques can be employed including relative and adaptive thresholds in certain embodiments based on characteristics of one or both of the images, but even a static threshold can be used in certain embodiments to construct the initial binary ghosting map (BGM) which determines if a pixel is likely to be a ghost pixel or not. Typically this determination is made on the luminance channel if available (e.g. in YCC color space), but may optionally be determined using multiple color channels and applying a majority voting system (e.g. in RGB color space with noticeable variation on 2 of 3 channels to confirm a ghost pixel).

Now as mentioned previously some areas of the overexposed (OE) image may be of such high luminance that they are effectively saturated and otherwise useful structural details or texture has been lost within these image regions. In certain embodiments, the existence of such regions determines if an image is over-exposed or not, and the level of exposure of the overexposed image can depend in certain embodiments on the percentage or degree of existence of these regions and/or on the percentage or degree of loss of detail due to saturation. Similar for the underexposed image with regard to detail lost due to darkness of pixels. These regions are referred to herein as burnt regions whether they involve detail lost due to saturation in the OE or darkness in the UE.

Step 4 involves determining burnt regions. This can be using a static or dynamic threshold, e.g. luminance pixels >240, or with more sophisticated image analysis techniques. The goal is to clearly delineate regions where image detail is destroyed by overexposure. These regions are known as "burnt" image regions and the map of such pixels is referred to as the burnt regions map (BRM) and like the ghosting map it is also in certain embodiments a binary map, such that the pixels are each classified as burnt, or not.

Step 5 of the example process of FIG. 1A, involves blurring the binary ghosting map (BGM) within regions which overlap with the BRM. This creates a grayscale map with values running from 0-255, from the binary ghosting map, known as a "blurred binary ghosting map" (BBGM). It also eliminates any sharp binary transitions between ghosting map pixels.

At step 6, basically the reverse of step 2 is performed including adjusting the exposure of the OE image to that of the UE image using histogram matching, or equivalent methods. This new image is the "adjusted" output image (AOE) and after exposure adjustment it should be almost the same as the UE image except for (i) ghost pixels and (ii) burnt pixels. Now in the burnt pixels regions as image structure and texture was already lost there can be no recovery of image data within these regions. But as the AOE and the UE images are now at the same exposure, these regions can be restored to the AOE image from the UE image.

In certain embodiments, when the dynamic range is meant to be moderately or slightly extended, there may be fewer burnt pixels or no burnt pixels either due to saturation for the OE or due to darkness for the UE. In those embodiments, the steps described to compensate for burnt regions are either not included or optional. Thus, in an extreme case where exposure levels for the OE and UE result in no burnt regions due to saturation nor to darkness, an alternative embodiment includes a method for generating an output image with an extended dynamic range that involves acquiring first and second digital images of approximately a same scene that have first and second exposure levels, respectively. An adjusted version of the first digital image is generated as an adjusted first digital image. The exposure level of the first digital image is globally modified to approximately a same first matching exposure level as the second digital image. The second digital image is globally aligned with the first or adjusted first digital image or both. A ghosting map is generated based on a first threshold and absolute differences between corresponding pixels of the adjusted first digital image and the second digital image. An adjusted version of the second digital image is generated as an adjusted second digital image. An exposure level of the second digital image is globally modified to approximately a same second matching exposure level as the first digital image. The method further includes alpha blending the adjusted second digital image and the first digital image based on the ghosting map to generate an output image. Regions may be blurred for various reasons, and if so, then a blurred region map may be generated, and alpha blending of an intermediate safe underexposed image may be blended with the overexposed image based on this blurred region map to yield a final output image.

Referring back now to FIG. 1A, at step 7, alpha blending of the UE and AOE images is performed based on the BBGM map. This effectively copies image data from the UE image into the burnt regions of the AOE image to create a "safe" OE image (SUE).

At step 8 the BRM map is also blurred to provide a grayscale BBRM. The final step 9 depicted in FIG. 1A involves combining the SUE image with the original OE image using the BBRM to alpha blend the two images together into a final output image.

Figure 1B:
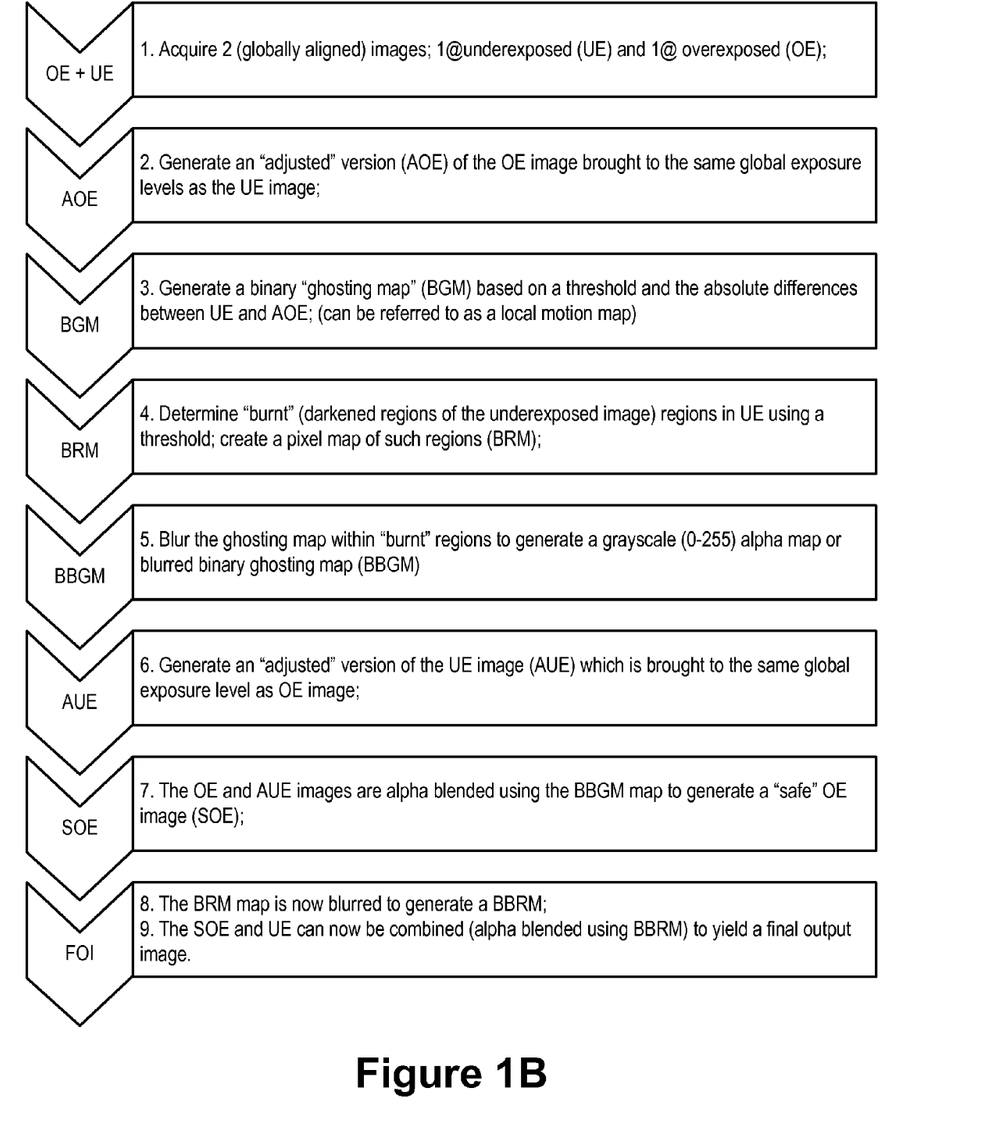
FIG. 1B illustrates a workflow of another technique for extending a dynamic range of a scene captured in a digital image in accordance with certain embodiments.

In an alternative embodiment, shown in FIG. 1B, the over exposed image can be adjusted down to the exposure level of the underexposed image to provide an AOE image instead at step 2. A ghosting map is similarly determined for step 3, but it is regions of the UE image that are of such low luminance that no image structure or texture can be discerned in such regions. These regions are analogous to burnt regions although they are more correctly known as "dark" regions per step 4. Burnt regions (actually "dark" regions) are determined and the ghosting map is blurred within such regions per step 5. In steps 6 & 7, an adjusted under-exposed image (AUE) is brought to the same exposure as the OE and combined using the BBGM to generate a safe overexposed (SOE) image. Finally the SOE and UE are combined using the BBRM to yield a final output image.

Figure 2:
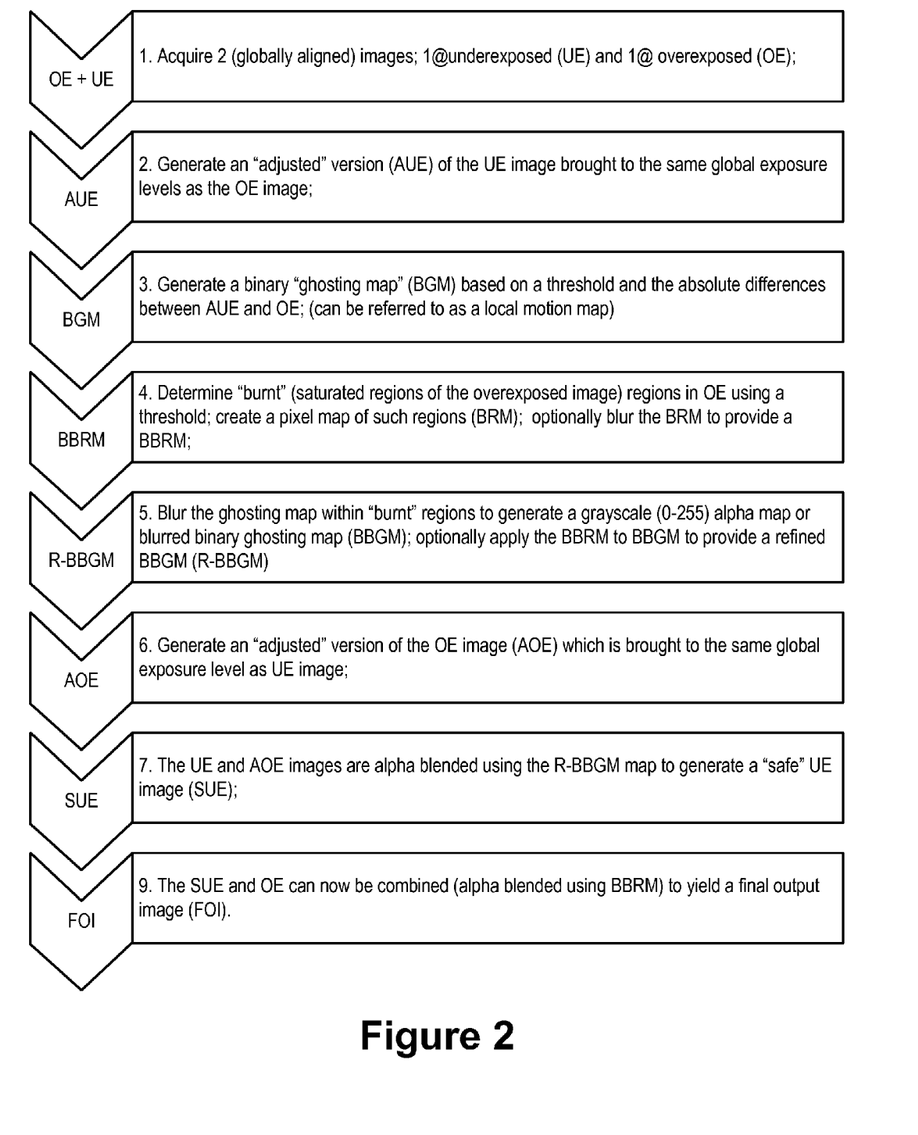
FIG. 2 illustrates a workflow of another technique for extending a dynamic range of a scene captured in a digital image in accordance with certain embodiments.

In a further alternative embodiment illustrated in FIG. 2, the blurred BRM is generated just after the original BRM in step 4 and applied to the blurred binary ghosting map during step 5 to provide a refined blurred binary ghosting map (R-BBGM). Steps 6 & 7 remain the same, but the R-BBGM is used in step 7 rather than the BBGM. The final step remains the same, combining SUE and OE, alpha blended with BBRM to generate the final output image. This variant can provide more aesthetically pleasing results in certain conditions of image acquisition.

Another example process in accordance with certain embodiments is as follows. Two or more image frames are captured with different exposures. Automatic exposure calculations may be performed using preview frames. In this way, an entire scene dynamic range, i.e., shadows and highlights, is captured. Next, the images are registered. The registration process compensates for camera motion during image capture and enables HDR capture with hand-held cameras even without use of a tripod. Ghosting artifacts are caused by moving objects between frames. Ghosting correction is next performed in accordance with certain embodiments and as described below. Now, HDR image blending is performed. An advantage technique is used for image blending in accordance with certain embodiments which preserves global contrast while maintaining a natural look and the overall image aspect designed by the camera's manufacturer. Other classical HDR merging and tone-mapping methods can be safely applied without the risk of ghosting artifacts, using the registered images with the same structural content.

Figure 3:
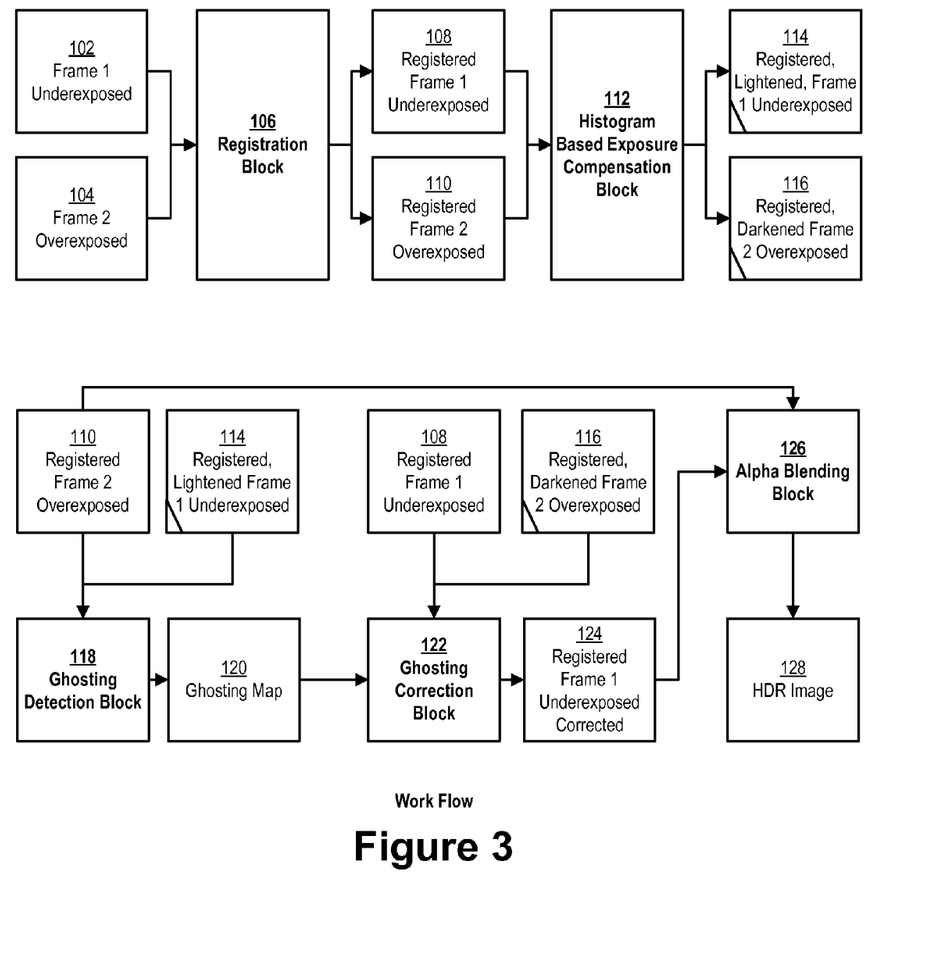
FIG. 3 schematically illustrates a workflow in accordance with another technique for extending the dynamic range of the captured scene in accordance with certain embodiments.
Figure 4:
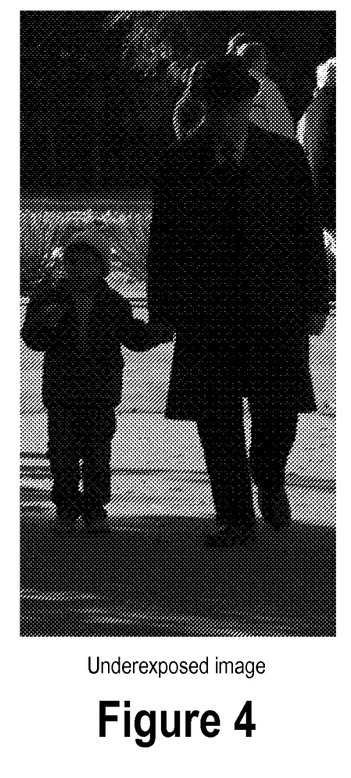
FIG. 4 illustrates an underexposed image.
Figure 5:
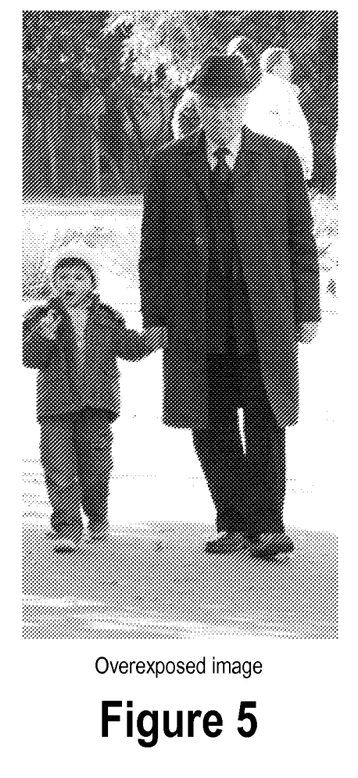
FIG. 5 illustrates an overexposed image.

Referring now to FIG. 3, a first frame is acquired 102. In this example, the first frame or first image is under-exposed while in other embodiments the first frame is over-exposed or normally exposed. A second frame or second image is acquired at 104. In this example, the second frame or second image is over-exposed while in other embodiments the second frame is under-exposed or normally exposed. FIGS. 4 and 5, respectively, illustrate under-exposed and over-exposed images. While the two differently-exposed images of the approximately same scene may vary in terms of their relative and/or absolute exposure levels, in sign and/or magnitude, from the examples provided herein in accordance with embodiments, the technique will provide images with advantageously extended dynamic ranges at various different exposure values and/or stop settings for each of the two images. The degree of the extending of the dynamic ranges will vary depending on the details of the relative magnitude and/or sign of the difference between the two exposure levels.

Figure 6:
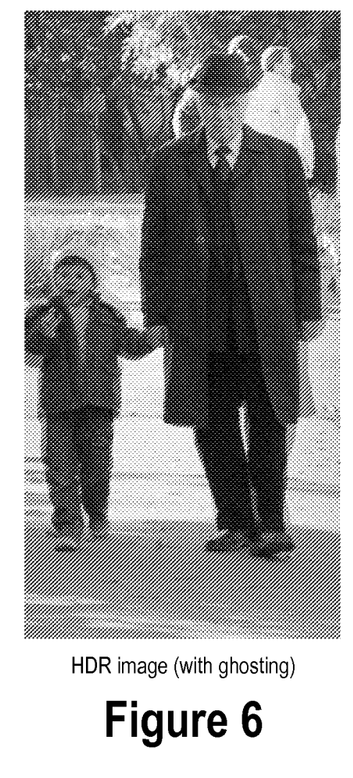
FIG. 6 illustrates a HDR image and/or image with extended dynamic range generated by the combination of the underexposed and overexposed images advantageously without ghosting artifacts in accordance with certain embodiments.

The first and second images will not necessarily have precisely the same content. Thus, by combining images 102 and 104, ghosting will typically result as illustrated in the example picture of FIG. 6. The first and second frames are registered 106, so that the system now has a registered underexposed frame 108 and a registered overexposed frame 110.

Now, a histogram-based exposure compensation block 112 is applied to the underexposed and overexposed registered frames 108 and 110. Image histograms are analyzed to, in some embodiments, bring the overexposed registered frame 110 into the same exposure space as the underexposed registered frame 108 and, respectively, the underexposed registered frame 108 into the exposure space of the overexposed registered frame 110. This produces a registered, lightened underexposed frame 114 and a registered, darkened overexposed frame 116. Examples of 114 and 116 are shown respectively at FIGS. 7 and 8.

Figure 7:
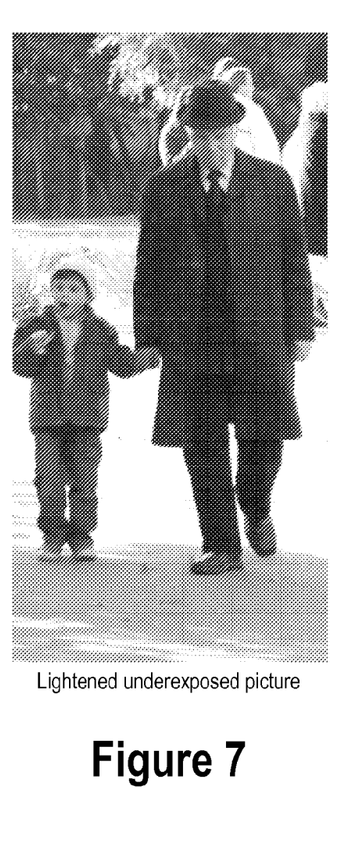
FIG. 7 illustrates a lightened underexposed picture.
Figure 8:
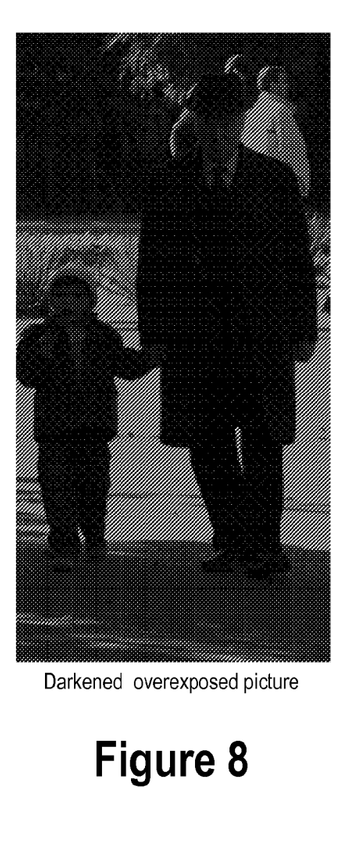
FIG. 8 illustrates a darkened overexposed picture.

Lightening the underexposed frame 108 to the same exposure level as the overexposed frame 110, to generate the lightened underexposed image 114 of FIG. 7, has the advantage that the lightened underexposed image 114 is now at approximately the same exposure level as the overexposed frame 110 without adjusting the overexposed frame 110 in terms of its exposure. Likewise, darkening the overexposed frame 110 to the same exposure level as the underexposed frame 108 to generate the darkened overexposed image 116 of FIG. 8, has the advantage that the darkened overexposed image 116 is now at approximately the same exposure level as the underexposed frame 108 without adjusting the underexposed frame 108 in terms of its exposure.

With regard to processing power and computational resources, a significantly lower computational effort is generally involved in adjusting the exposure of one image compared with two (or two compared with four, etc). That is, simply put, the effort is about half to adjust one image instead of two. For a 16 Mp image, e.g., or perhaps even a more data rich image as may be available, this advantage can be appreciable, particularly when the computations are being performed on embedded devices, whether they be camera-enabled or not, or on miniature or full-size digital cameras, or if network connections are involved, among other considerations.

Also, an overexposed image 110 can contain "burnt" regions, e.g., loss of detail due to saturation, and likewise an underexposed image 108 can contain "burnt" regions, e.g., loss of detail due to excessive darkness, and adjusting the overexposed image 110 to generate image 116, and image 108 to generate image 114, can tend to generate some false data with regard to the burnt regions. While compensation for these may be provided in techniques provided in accordance with certain embodiments, e.g., by blurring a ghosting map and/or by generating and blurring a burnt region map, as described with reference to FIGS. 1A, 1B and 2, these false data may either not be fully controlled in the beginning phase that involves creating image pairs (108, 116) and (110, 114) at same exposure levels from the image data of the image pair (108, 110) captured at different exposure levels, or may be substantially controlled at some higher cost in terms of resources, introduction of artifacts and/or a decrease of the global performance.

With these considerations in mind, nonetheless, in alternative embodiments, image pairs may be created that are at an approximately same exposure level, yet are at another exposure level different from either of the exposure levels of the overexposed image 110 or the underexposed image 108. In the example where those levels respectively are +2 eV and −2 eV, then image pairs may be created with each image being at an approximately a same exposure level different from either of these two original levels, such as +1.5 eV, −1.5 eV, +1.9 eV, −1.9 eV, +1 eV, +0.5 eV, −1 eV, −0.5 eV. Even levels higher than +2 eV or lower than −2 eV, or whatever the original levels are, are possible and could provide advantage. However, most embodiments, as described, involve selecting levels for the overexposed frame 102 and the underexposed frame 104 that are far apart so that the dynamic range can be extended farther. In one embodiment, those levels are selected to be as far apart as possible without losing too much or an excessive or over the limit amount of detail due to saturation in the overexposed frame 102, 110 and/or to darkening in the underexposed frame 104, 108

Figure 9:
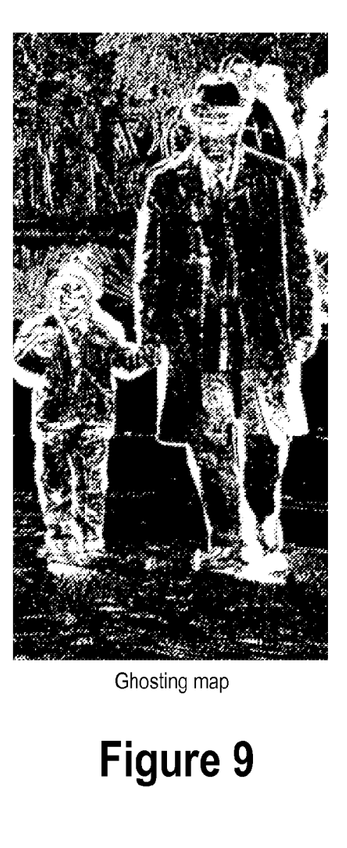
FIG. 9 illustrates a ghosting map in accordance with certain embodiments.
Figure 10:
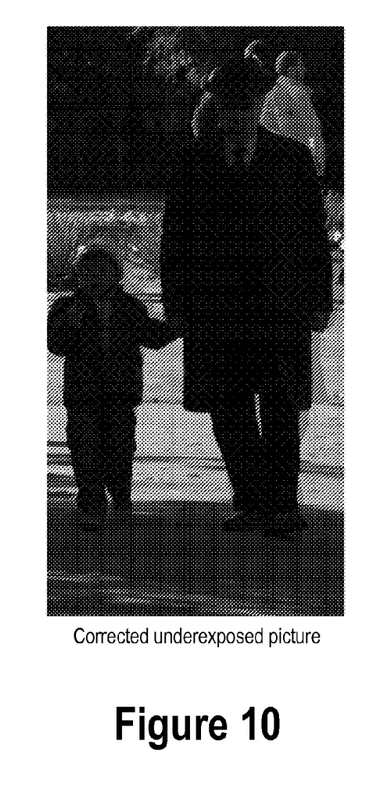
FIG. 10 illustrates a corrected underexposed picture in accordance with certain embodiments.
Figure 11A:
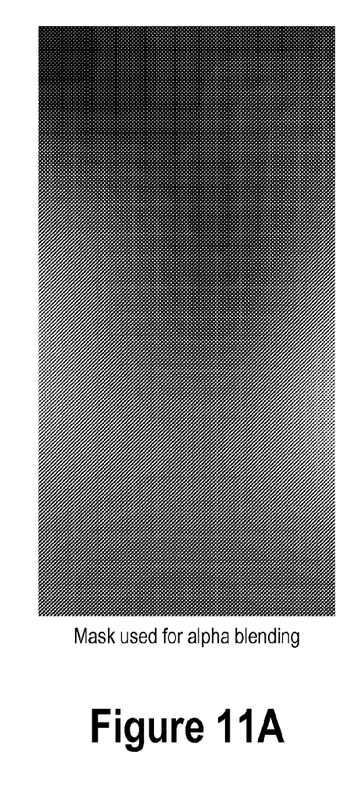
FIGS. 11A and 11B illustrate a mask used for alpha blending in accordance with certain embodiments.
Figure 11B:
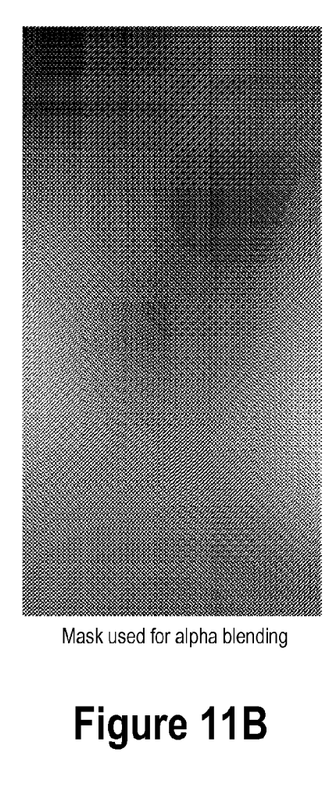
Figure 12:
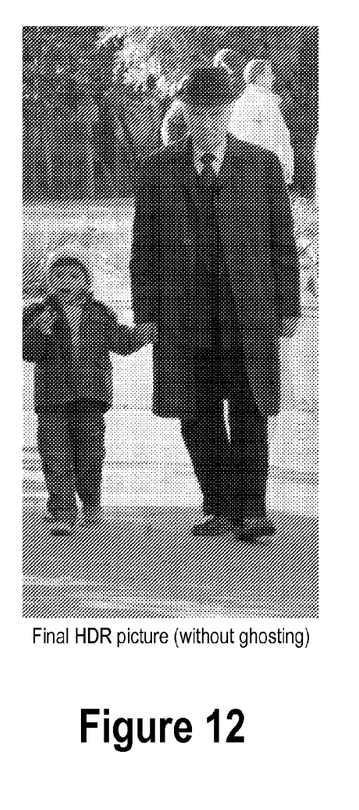
FIG. 12 illustrates an image having an extended dynamic range and/or HDR picture without ghosting advantageously generated by a technique in accordance with certain embodiments.

A ghosting detection block 118, as illustrated in FIG. 3, is then applied to registered overexposed frame 110 and registered, lightened underexposed frame 114. A ghosting map 120 is generated in certain embodiments and an example is illustrated in FIG. 9. A ghosting correction block 122 is applied to registered underexposed frame 108 and registered, darkened overexposed frame 116 in the embodiment illustrated at FIG. 3. A registered underexposed corrected frame 124 is generated and an example is illustrated at FIG. 10. An alpha blending block 126 is applied to registered overexposed frame 110 and registered underexposed corrected frame 124 as illustrated in FIG. 3. An example of a mask used for alpha blending 126 is illustrated in FIGS. 11A and 11B. An advantageous HDR image 28 is produced without ghosting as illustrated in the example of FIG. 12.

Alpha blending generally involves a convex combination of two colors allowing for transparency effects in computer graphics. The value of alpha in the color code may range from 0.0 to 1.0, where 0.0 represents a fully transparent color, and 1.0 represents a fully opaque color.

The value of the resulting color when color $Value_1$ with an alpha value of a is drawn over an opaque background of color $Value_0$ may be given by:

$$Value = (1-\alpha)Value_0 + \alpha Value_1$$

The alpha component may be used to blend the red, green and blue components equally, as in 32-bit RGBA, or, alternatively, there may be three alpha values specified corresponding to each of the primary colors for spectral color filtering. Similarly this can be applied to the YUV colorspace equally on the luminance and on the chrominances, or individually for each component.

Techniques in accordance with certain embodiments offer robust solutions for capturing HDR images and/or images having an extended dynamic range using multiple exposures, i.e., two exposures in some embodiments or alternatively three or more exposures in other embodiments, and provide particular advantage when working with non-static scenes and/or a hand-held or otherwise non-static camera. These techniques combine information from two different exposures, and work in certain embodiments according to the workflow illustrated at FIGS. 1A, 1B, 2 and 3 and otherwise as described herein.

In another embodiment, use is made of low resolution camera preview (or postview) frames, wherein a wide range of exposure values may be evaluated and the best two exposures chosen. The evaluation may be based on one or more image histograms, and may include detecting a first exposure 102 with correctly exposed highlights and a last exposure 104 with well exposed shadows.

The two images (overexposed 104 and underexposed 102) are registered 106 or aligned. Registration methods are described in the cited patent matters below. For example, an integral projections-based registration method may be used in certain embodiments. In certain embodiments, it is noted that registration may alternatively or may also be performed between frames 108, 110 and/or frames 114, 116 and/or 110, 114 and/or 108, 116 and/or between other frames that may involve different processes or alternatives to embodiments of those described herein.

When the two frames are combined without compensation, ghosting artifacts caused by moving objects and image registration shortcomings (rotational movement or image distortion) can typically become apparent. In order to correct these artifacts, the two images are advantageously brought into the same domain in accordance with certain embodiments. Unlike other known methods that use the camera's response function to transform the two exposures, these embodiments utilize a histogram based transformation 112. The histogram of the underexposed image 108 may be transformed to resemble the histogram of the overexposed image 110, and vice-versa. This way, two new versions of the images are offered: the lightened underexposed image 114 and the darkened overexposed image 116.

Histogram-based exposure compensation in accordance with certain embodiments may involve the following. Two (or more) images are used as inputs in a HDR process or otherwise in extending a dynamic range, including a first underexposed image (e.g., −2 EV) and a second overexposed image (e.g., +2 EV). By the mentioned techniques, two new images are produced: one is obtained by transforming the underexposed image to match its histogram with the histogram of the overexposed image, while the other one is obtained by transforming the overexposed image to match its histogram with the histogram of the underexposed image. The technique may in certain embodiments involve a tone-mapping transformation that modifies an original image histogram to be more like the histogram of the aimed image. The technique may be referred to as "Histogram Matching (Specification)" and a detailed description of examples of such technique can be found in Rafael C. Gonzalez and Richard E. Woods "Digital image processing", Second Edition, Ed Prentice Hall, 2001, which is hereby incorporated by reference; and see particularly subsection 3.3.2, pages 94-103.

Using the overexposed image 110 and the lightened underexposed image 114, a ghosting map 120 is computed using ghosting detection block 118. The two images 110,114 will have different structural content (caused by moving objects or registration errors) but approximately the same exposure level. By computing the difference between the two images with the same exposure levels but different structural content and applying a threshold, a binary ghosting map 120 is obtained. To avoid steep transitions between the ghosting affected areas and the rest of the image, the ghosting map may be blurred in accordance with certain embodiments as indicated by BBGM in FIGS. 1A, 1B and R-BBGM in FIG. 2. In certain embodiments, the blurring is performed using a large Gaussian kernel. These kinds of transition are usually visible only in the light areas of the images, so the blurring is applied in certain embodiments to the regions where one of the image's luminance is greater than a certain threshold, while not being applied where the threshold is not met.

Using the ghosting map 120 in the ghosting correction stage 122, the underexposed image 108 is modified in certain embodiments by filling the ghosting affected areas with content from the darkened overexposed image 116. This way, the underexposed and overexposed images 108,116 will advantageously have the same or more nearly the same structural content and can be safely combined. This correction may be realized through an alpha blending process between the underexposed image 108 and darkened overexposed image 116, using the previously obtained ghosting map 120 as alpha mask. The advantage of this approach is that compensation for the local motion identified in the underexposed image 108 is provided by replacing it with a corresponding area from the overexposed image 116 brought into the exposure space of the underexposed image 108.

Figure 13:
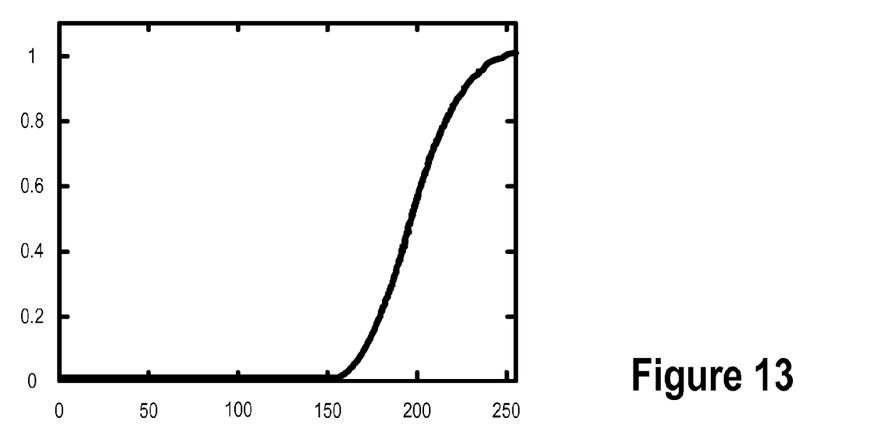
FIG. 13 is a plot of alpha value versus an image data parameter for an alpha blending process in accordance with certain embodiments.
Figure 14:
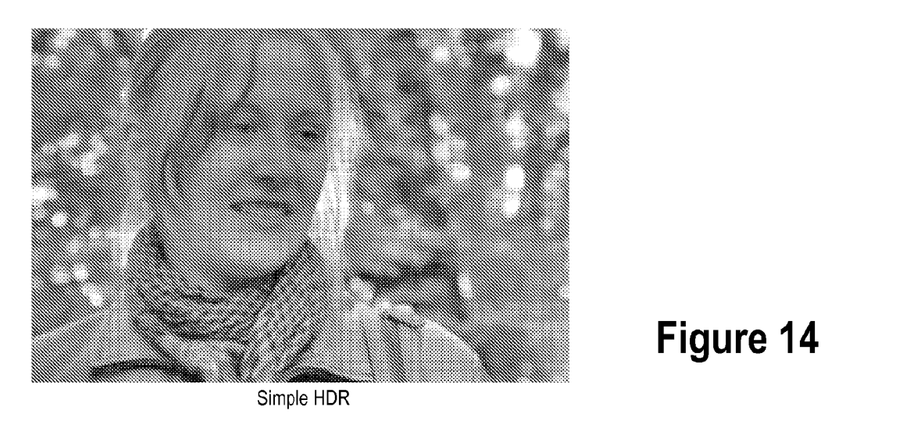
FIG. 14 illustrates a global HDR or extended dynamic range image in accordance with certain embodiments.

The two images 108,116 are combined in certain embodiments by alpha blending 126 using a mask. The mask may be computed by selecting which areas are used from the overexposed image 116 according to the graphic presented in FIG. 13 of the value of alpha ranging from 0 to 1 on the y-axis and plotted versus an image data coordinate parameter. Blurring is applied in certain embodiments to avoid steep transitions. An image 128 that captures an extended dynamic range of the scene is produced, for example, as illustrated in FIG. 14. The advantage of this method is that large overexposed areas are selected from the underexposed image and the underexposed areas from the overexposed image, and are merged together without substantial changes preserving the overall image appearance intended by the manufacturer.

In order to avoid possible ghosting artifacts, a further processing may be applied on the ghosting map if the specific merging method presented in the previous paragraph is used. Large areas are taken just from one of the two input images, meaning no ghosting artifacts are possible in those regions. Considering this, in certain embodiments, there is no correction applied for the underexposed image in regions where the alpha blending mask is very close to 1 or 0. Therefore, the ghosting map may be filtered and only values corresponding to the transition areas between images are kept.

Figure 15:
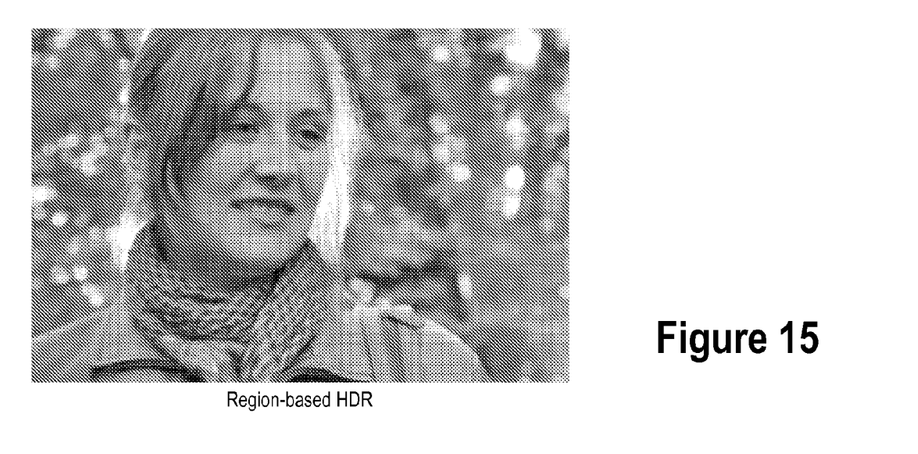
FIG. 15 illustrates a region-based HDR image or extended dynamic range image in accordance with certain embodiments.

Referring however to FIG. 15, the HDR or dynamic range extension effect may be applied in certain embodiments on certain regions of interest, by using information from a well exposed image for these regions. The advantage of this method is that by using information from only one of the exposures in sensible areas, the risk of any kind of artifacts is reduced, perhaps even to zero. Such areas can be faces or regions interactively selected by the user or by the device.

Figure 16A:
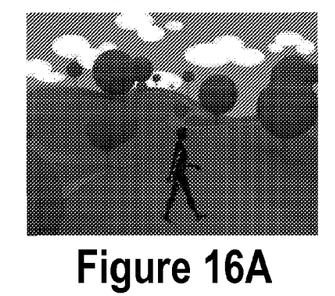
FIG. 16A-16F schematically illustrate an example of a technique for producing a HDR image and/or for extending a dynamic range of an image without ghosting artifacts in accordance with certain embodiments.
Figure 16B:
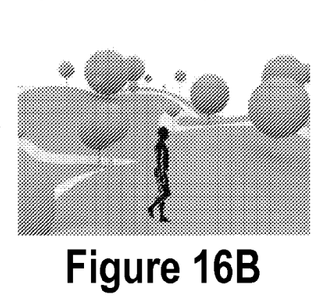
Figure 16C:
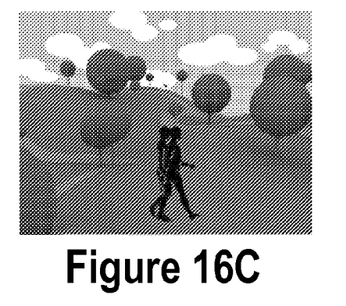
Figure 16D:
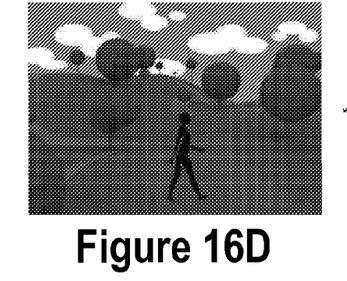
Figure 16E:
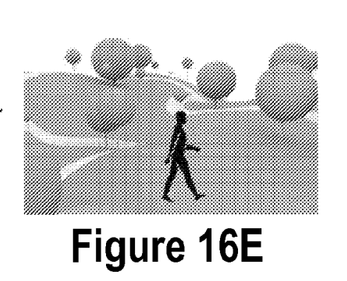
Figure 16F:
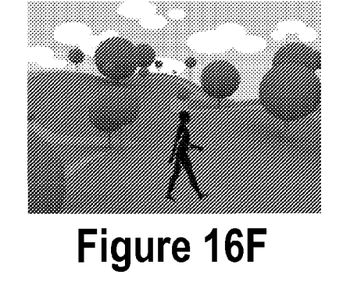

Ghosting removal is further illustrated at FIGS. 16A-16F. As mentioned, combining two image captures (or more) with different exposures and content can produce HDR images with ghosting artifacts as described and illustrated. FIG. 16A and FIG. 16B have different content, i.e., the person walking has a different position of her head, arms and legs, for example. The combination illustrated as FIG. 16C shows parts of both images, one being referred to as a translucent ghost of the other. In accordance with certain embodiments, however, one of the two pictures is advantageously transformed so that it has the same content or some of the same content as the other one, but with different exposure. FIGS. 16D and 16E show the person with head, arms and legs positioned in the same places. Thus, FIG. 16F does not show the ghost artifacts that FIG. 16C does.

Figures 17A, 17B, 17C, 17D, 17E:
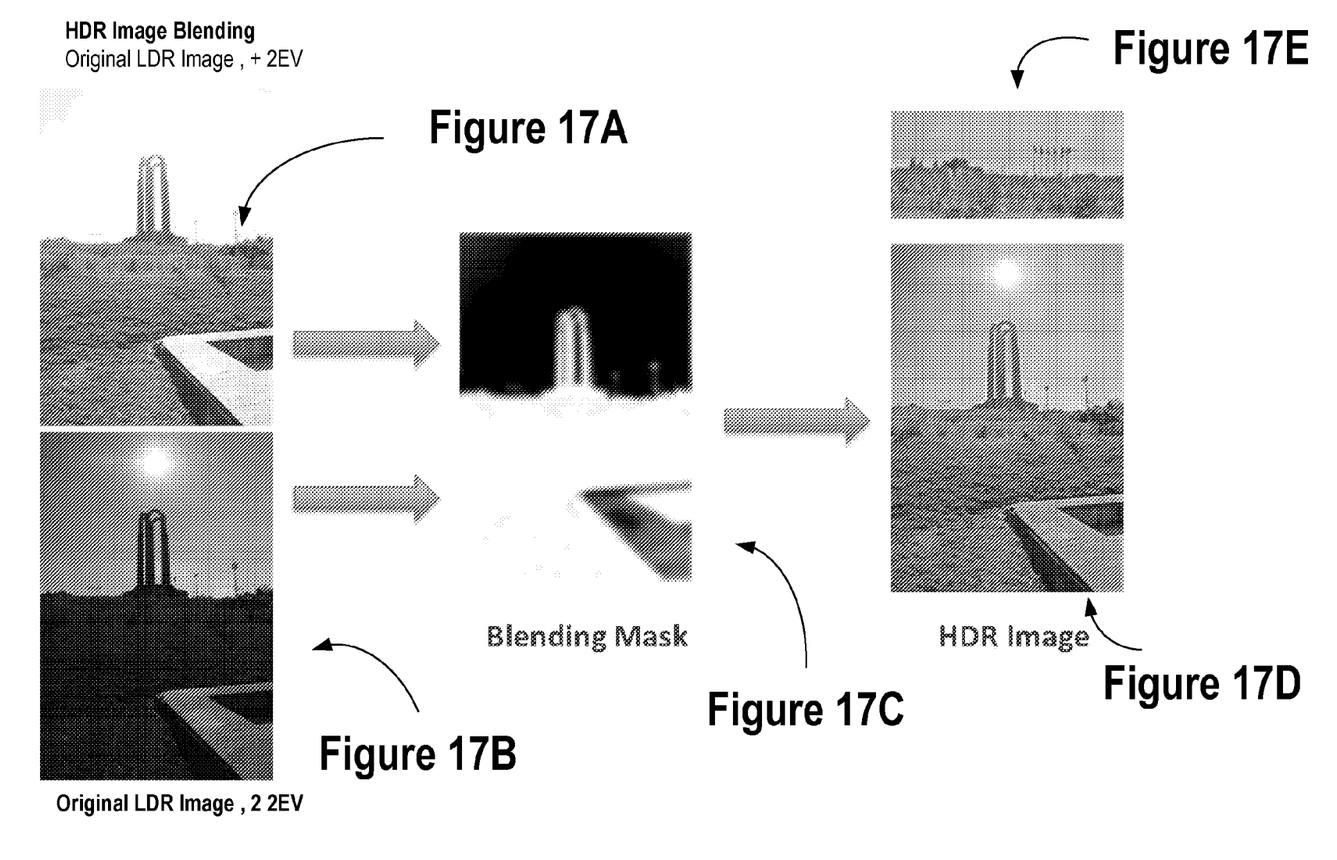
FIG. 17A-17E schematically illustrate an example of a technique for HDR image blending in accordance with certain embodiments.

Ghosting removal in accordance with certain embodiments may be independent of blending method, as well. That is, any of a variety of blending methods may be used to combine the two images which have the same content but different exposure. In certain embodiments, HDR image blending is performed as illustrated in FIGS. 17A-17E. Original LDR (low dynamic range) images of FIGS. 17A and 17B, e.g, of +2 eV and –2 eV, respectively, are captured. A blending mask such as that shown in FIG. 17C is used to produce the HDR image of FIG. 17D. Even the advantageous HDR image of FIG. 17E is possible in accordance with certain embodiments. In some embodiments, no region of interest is selected, and instead a manual or automatic zoom-in feature may be used to confirm the success of the technique or to otherwise more precisely determine a parameter or characteristic of an image before or after a certain processing is to be performed or is contemplated to be performed or has been performed. In another example embodiment, a region of interest is selected just left of the central architectural structure of FIGS. 17A and 17B. That is, features such as those flags hardly noticeable in FIGS. 17A and 17B are brought brilliantly in FIG. 17E using a region of interest feature in accordance with certain embodiments while the ghosting artifacts that would have been present in a magnified region or interest view have been eliminated because an extended dynamic range image has been produced in accordance with certain embodiments without showing ghosting artifacts either at all or within a tolerance depending on the zoom range of the ROI feature and in any case thereby permitting the image to have an extended dynamic range without being ruined in any large or small way by a ghosting artifact.

Advantageously in accordance with certain embodiments, a photograph that captures a higher dynamic range of the scene is generated from two differently exposed low dynamic range pictures.

The use of the de-ghosting allows more permissive image acquisition. The fact that artifacts are detected and corrected in accordance with certain embodiments means that input images are used that differ advantageously from past solutions, preserving the overall image aspect as designed by the camera producer.

The use of images with greater exposure (eV) difference enables capturing a larger dynamic range. Also, the use of images that differ in content (camera translation, rotation, object moving) permit techniques in accordance with certain embodiments to perform better for cameras held in hand, and/or for larger duration between consecutive acquisitions. Techniques in accordance with certain embodiments are advantageously adapted for regions of interest. These may be faces, skin or anything that a user indicates or that may be pre-programmed in a camera-enabled device. For such a case, artifacts do not appear due to use of pixels from the same image, i.e., mixing is not used. The CRF and its inverse are generally not used in these embodiments. Exposure compensation is done by histogram matching.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following belong to the same assignee and are hereby incorporated by reference for all purposes including as describing details of features and as disclosing alternative embodiments:

U.S. Pat. Nos. 7,620,218, 7,773,118, 7,660,478, 7,680, 342, 7,692,696, 7,551,755, 7,630,006, and 7,787,022; and United States published patent applications nos. US2010/ 0329582, US2009/0303343, US2009/0179999, US2009/ 0167893, US2009/0179998, US2008/0309769, US2009/ 0263022, US2009/0080796, US2008/0219581, US2008/ 0309770, US2007/0296833, US2010/0026833, US2009/ 0304278, US2009/0185753, US2008/0316341, US2008/ 0219581, and US2008/0013798; and U.S. patent application Ser. Nos. 12/959,281, 12/941,995, 12/907,921, 12/941,983, 12/879,003, 12/636,647, 13/020, 805, 61/406,970 and 61/417,737.

What is claimed is:

1. A digital image acquisition device, comprising:
a housing;
a lens and image sensor within the housing configured for capturing digital images;

a processor;
a memory having stored therein code for programming the processor to perform a method of generating an output image of a scene with an extended dynamic range, wherein the method comprises:
  acquiring first and second digital images of approximately a same scene at first and second exposure levels, respectively;
  generating an adjusted version of the first digital image as an adjusted first digital image, including globally modifying the exposure level of the first digital image to approximately a same first matching exposure level as the second digital image;
  globally aligning the second digital image with the first or adjusted first digital image or both;
  generating a ghosting map based on a first threshold and absolute differences between corresponding pixels of the adjusted first digital image and the second digital image;
  determining one or more burnt regions of the second image using a second threshold;
  creating a burnt pixel map of the burnt regions;
  generating a blurred ghosting map, comprising blurring pixels of the ghosting map that correspond to the burnt regions in the burnt pixel map;
  generating an adjusted version of the second digital image as an adjusted second digital image, including globally modifying the exposure level of the second digital image to approximately a same second matching exposure level as the first digital image;
  alpha blending the adjusted second digital image and the first digital image based on the blurred ghosting map to generate a safe first digital image; and
  alpha blending the safe first digital image and the second digital image based on the burnt pixel map to create an output image.

2. The digital image acquisition device of claim 1, wherein the generating of the blurred ghosting map further comprises applying the blurred burnt pixel map to pixels of the ghosting map after the blurring of the pixels of the ghosting map.

3. The digital image acquisition device of claim 2, wherein the method further comprises blurring the burnt pixel map before alpha blending the safe first digital image and the second digital image.

4. The digital image acquisition device of claim 1, wherein the generating of the blurred ghosting map further comprises applying the blurred burnt pixel map to pixels of the ghosting map after the blurring of the pixels of the ghosting map.

5. The digital image acquisition device of claim 1, wherein the burnt regions of the second image contain less detail due to overexposure and saturation than corresponding regions of the first image.

6. The digital image acquisition device of claim 1, wherein the burnt regions of the second image contain less detail due to underexposure and darkness than corresponding regions of the first image.

7. The digital image acquisition device of claim 1, wherein the ghosting map comprises a binary ghosting map.

8. The digital image acquisition device of claim 1, wherein the acquiring of the first and second digital images comprises using the lens and the image sensor.

9. The digital image acquisition device of claim 1, wherein the first matching exposure level comprises the second exposure level, and the second matching exposure level comprises the first exposure level.

10. The digital image acquisition device of claim 1, further comprising adjusting the exposure levels of the first and second digital images to the second and first matching exposure levels, respectively, to match the exposure levels of the adjusted second and first images.

11. One or more non-transitory digital storage media having stored therein code for programming a processor-based and camera enabled device to perform a method of generating an output image of a scene with an extended dynamic range, wherein the method comprises:
  generating an adjusted version of a first digital image of a scene that was captured at a first exposure level as an adjusted first digital image, including globally modifying the first exposure level to approximately a same first matching exposure level of a second digital image that was captured of approximately a same scene;
  globally aligning the second digital image with one or both of the first digital image and the adjusted first digital image;
  generating a ghosting map based on a first threshold and absolute differences between corresponding pixels of the adjusted first digital image and the second digital image;
  determining one or more burnt regions of the second image using a second threshold;
  creating a burnt pixel map of the burnt regions;
  generating a blurred ghosting map, comprising blurring pixels of the ghosting map that correspond to the burnt regions in the burnt pixel map;
  generating an adjusted version of the second digital image as an adjusted second digital image, including globally modifying the exposure level of the second digital image to approximately a same second matching exposure level as the first digital image;
  alpha blending the adjusted second digital image and the first digital image based on the blurred ghosting map to generate a safe first digital image; and
  alpha blending the safe first digital image and the second digital image based on the burnt pixel map to create an output image.

12. The one or more non-transitory digital storage media of claim 11, wherein the generating of the blurred ghosting map further comprises applying the blurred burnt pixel map to pixels of the ghosting map after the blurring of the pixels of the ghosting map.

13. The one or more non-transitory digital storage media of claim 12, wherein the method further comprises blurring the burnt pixel map before alpha blending the safe first digital image and the second digital image.

14. The one or more non-transitory digital storage media of claim 11, wherein the generating of the blurred ghosting map further comprises applying the blurred burnt pixel map to pixels of the ghosting map after the blurring of the pixels of the ghosting map.

15. The one or more non-transitory digital storage media of claim 11, wherein the burnt regions of the second image contain less detail due to overexposure and saturation than corresponding regions of the first image.

16. The one or more non-transitory digital storage media of claim 11, wherein the burnt regions of the second image contain less detail due to underexposure and darkness than corresponding regions of the first image.

17. The one or more non-transitory digital storage media of claim 11, wherein the ghosting map comprises a binary ghosting map.

18. The one or more non-transitory digital storage media of claim 11, wherein the first matching exposure level comprises the second exposure level, and the second matching exposure level comprises the first exposure level.

19. The one or more non-transitory digital storage media of claim 11, wherein the method further comprises adjusting the exposure levels of the first and second digital images to the second and first matching exposure levels, respectively, to match the exposure levels of the adjusted second and first images.

20. A method of generating an output image with an extended dynamic range, comprising:
    acquiring first and second digital images of approximately a same scene that have first and second exposure levels, respectively;
    generating an adjusted version of the first digital image as an adjusted first digital image, including globally modifying the exposure level of the first digital image to approximately a same first matching exposure level as the second digital image;
    globally aligning the second digital image with the first or adjusted first digital image or both;
    generating a ghosting map based on a first threshold and absolute differences between corresponding pixels of the adjusted first digital image and the second digital image;
    determining one or more burnt regions of the second image using a second threshold;
    creating a burnt pixel map of the burnt regions;
    generating a blurred ghosting map, comprising blurring pixels of the ghosting map that correspond to the burnt regions in the burnt pixel map;
    generating an adjusted version of the second digital image as an adjusted second digital image, including globally modifying an exposure level of the second digital image to approximately a same second matching exposure level as the first digital image;
    alpha blending the adjusted second digital image and the first digital image based on the blurred ghosting map to generate a safe first digital image; and
    alpha blending the safe first digital image and the second digital image based on the burnt pixel map to create an output image.

21. The method of claim 20, wherein the generating of the blurred ghosting map further comprises applying the blurred burnt pixel map to pixels of the ghosting map after the blurring of the pixels of the ghosting map.

22. The method of claim 20, further comprising blurring the burnt pixel map before alpha blending the safe first digital image and the second digital image.

23. The method of claim 22, wherein the generating of the blurred ghosting map further comprises applying the blurred burnt pixel map to pixels of the ghosting map after the blurring of the pixels of the ghosting map.

24. The method of claim 20, wherein the burnt regions of the second image contain less detail due to overexposure and saturation than corresponding regions of the first image.

25. The method of claim 20, wherein the burnt regions of the second image contain less detail due to underexposure and darkness than corresponding regions of the first image.

26. The method of claim 20, wherein the ghosting map comprises a binary ghosting map.

27. The method of claim 20, wherein the first matching exposure level comprises the second exposure level, and the second matching exposure level comprises the first exposure level.

28. The method of claim 20, further comprising adjusting the exposure levels of the first and second digital images to the second and first matching exposure levels, respectively, to match the exposure levels of the adjusted second and first images.

* * * * *